May 2, 1944.  C. M. MacCHESNEY ET AL  2,348,084
TIRE COVER AND PACKAGE
Filed Oct. 31, 1940
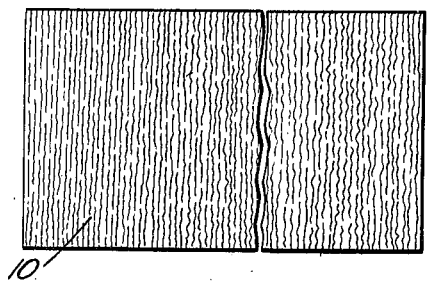
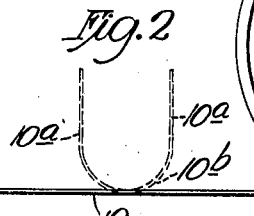
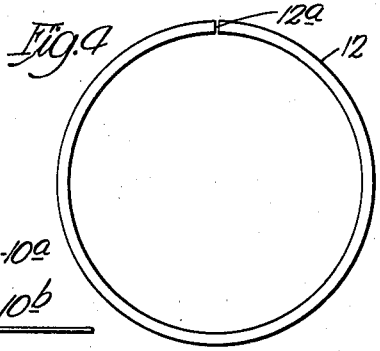
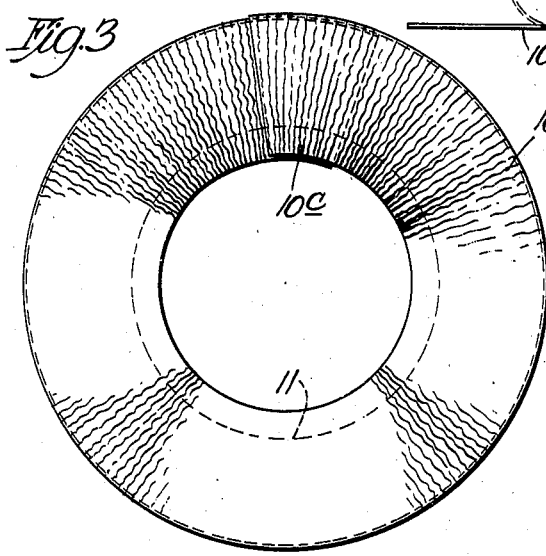
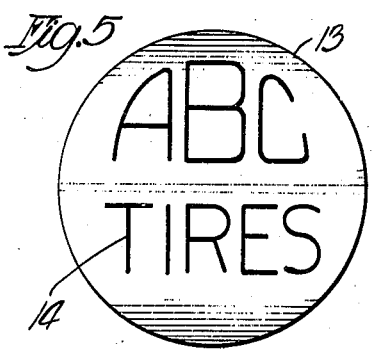
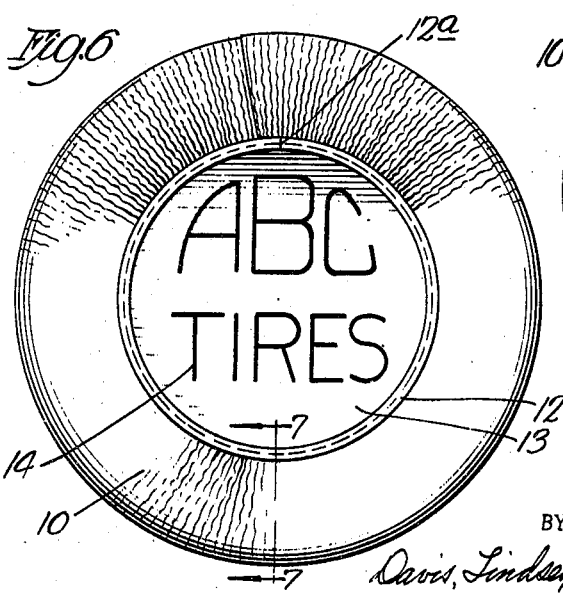
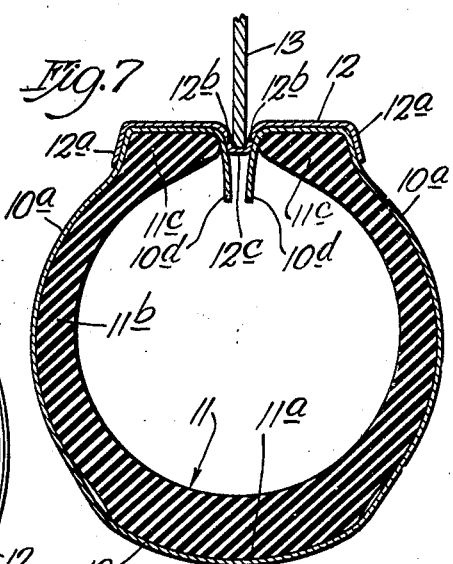
INVENTORS
Chester M. MacChesney
BY Allen B. Wilson
Davis, Lindsey, Smith & Shonts, ATTORNEYS Patented May 2, 1944

2,348,084

UNITED STATES PATENT OFFICE 2,348,084

TIRE COVER AND PACKAGE

Chester M. MacChesney, Chicago, and Allen B. Wilson, Evanston, Ill., assignors to Acme Steel Company, Chicago, Ill., a corporation of Illinois Application October 31, 1940, Serial No. 363,674

3 Claims. (Cl. 206—46)

This invention relates to improvements in covers for annular or toroidal articles such as automobile tires and the like, and its purpose is to provide an improved and inexpensive cover which may be quickly and easily applied and removed.

Heretofore, automobile tires and the like have been allowed to go uncovered or they have been covered according to the usual practice with helical wrappings of paper, during shipment from the manufacturers to the jobbers and dealers and during subsequent storing preliminary to use. It is desirable that these rubber tires and the like be protected in order to preserve their initial condition and appearance but, although the helical paper wrappings have afforded adequate protection, their application has involved considerable difficulty and expense, they have been capable of ready removal only by completely destroying them, and they have not been attractive in appearance.

The principal object of the present invention is to provide an improved package comprising an annular or toroidal article provided with an improved wrapping or cover in the use of which the difficulties encountered with former wrappings are overcome and the time and expense of application and removal are reduced. A further object is to provide an improved form of cover for an annular object comprising parts which are capable of re-use. Another object is to provide an improved cover for an annular article comprising a channel-shaped non-metallic member, formed of paper, rubber or the like, adapted to be applied to the article by radial inward movement over its outer periphery, after which the edges of the cover are folded into the interior of the tire through the slot extending around its inner periphery and the cover and the article are then held in assembled relationship by a metallic rim. Another object is to provide an improved tire cover comprising a flexible non-metallic covering extending around the outer surfaces of the tire and into the slot around the inner periphery thereof in combination with a split metallic rim adapted to hold the non-metallic cover in engagement with the beads of the tire and to interlock with the beads to prevent its lateral displacement. Another object of the invention is to provide an improved tire cover comprising a part extending around the outer surfaces of the tire and secured in place by an annular metallic rim which is held in engagement with the tire by a locking disk which is also capable of carrying advertising matter. Other objects relate to various features of construction and arrangement which appear more fully hereinafter.

The nature of the invention will be understood from the following specification, taken with the accompanying drawing, in which one embodiment is illustrated. In the drawing, Figure 1 shows a top plan view of a flexible sheet of paper, rubber or the like, which is adapted for use in forming the tire cover of the present invention;

Fig. 2 shows an end view of the sheet illustrated in Fig. 1 with a showing by dotted lines of the form of the sheet after it has been bent into a member of channel-shaped cross section adapted to be fitted over the periphery of the tire;

Fig. 3 shows a side elevation of the paper cover applied to the tire preliminary to the application of the metallic rim by which the paper cover is held in place;

Fig. 4 shows a side elevation of the metallic rim which is used for holding the paper cover on the tire;

Fig. 5 shows a side elevation of the circular disk which fits within the metallic rim;

Fig. 6 shows a side elevation of the complete package comprising a tire having a paper cover held in place by a metallic rim which is locked in position by the circular disk shown in Fig. 5; and Fig. 7 shows an enlarged radial section taken on the line 7—7 of Fig. 6.

The tire cover of the present invention comprises an elongated sheet 10 formed preferably of crepe paper or "crinkled" paper which is preferably of substantial thickness and which is provided with a plurality of more or less irregular and substantially parallel corrugations which render the sheet extensible transversely to these corrugations so that it may be applied to objects of various shapes. Instead of using paper, the sheet 10 may be formed of rubber, or of a transparent product derived from rubber and known as "Pliofilm," or of any other flexible non-metallic material which may be suited for the purpose. This sheet is cut to such a size that it will pass around the outer peripheral surface of the tire while permitting the lateral edge portions of the sheet to be bent around the outer side of the tire and thence through a slot extending around the inner periphery of the tire. Before applying the sheet to the tire it is preferably bent or folded, as shown in Fig. 2, and curved longitudinally to form a member of U-shaped cross section comprising side walls 10ª connected by an annular curved portion 10ᵇ and having the required longitudinal curvature to fit the tire casing. The sheet may preferably be given a channel shape and at the same time have an annular form imparted thereto by the method described and claimed in the United States patent of Chester M. MacChesney, No. 2,033,201, dated March 10, 1936, in which event the longitudinally curved member of channel-shaped cross section, which is cut to the proper length either before or after being curved and folded, may be readily applied around the tire casing so that its ends will overlap, as shown at 10ᶜ in Fig. 3. If the sheet is formed of crinkled paper, for example, the crinkles permit of relative expansion of different parts of the sheet so that the curved channel-shaped member may be made to fit accurately the surface of the tire casing.

The automobile tire 11 is best shown in Fig. 7 where it is illustrated as having a tread portion 11ª, side walls 11ᵇ, and annular bead portions 11ᶜ which form the boundaries of the annular slot which extends around the inner periphery of the tire. After applying the sheet of paper or the like to the tire as illustrated in Fig. 3, the marginal portions of the side walls 10ª of the sheet are bent inwardly over the bead portions 11ᶜ and thence radially inward into the slot between these bead portions, as shown in Fig. 7. There is then applied a metallic rim 12 which is split at one point 12ª around its periphery and which is constructed in the form of a double channel-shaped member having annular side flanges 12ª and inner flanges 12ᵇ which form the side walls of an inner channel 12ᶜ. This inner channel is adapted to extend partially into the slot between the bead portions of the tire and to hold the inwardly extending marginal edges 10ᵈ of the cover sheet against the inner edges of the bead portions while at the same time spacing these bead portions apart laterally. The flanges 12ª fit over the outer edges of the bead portions of the tire and hold the paper covering in contact therewith. This rim 12 is of such a diameter that after contracting it, by overlapping the ends thereof at the point 12ª, it may be snapped into position within the tire casing with its ends abutting against each other to hold it against contraction and with its inner channel portion 12ᶜ extending into the slot of the tire. The rim then holds the edge portions of the paper covering in place and its flanges 12ª and 12ᵇ restrain the beads of the casing against axial displacement in either direction.

When the rim 12 has been snapped into position within the tire to hold the paper cover in contact with the bead portions of the tire, a holding disk 13 is put in place within the inner channel 12ᶜ of the rim. This disk 13 is preferably formed of heavy cardboard or the like having some resiliency and this resiliency is adapted to cooperate with the resiliency of the split rim 12 so that the disk may be snapped into position within the channel of the rim. This action may be facilitated by bowing the middle portion thereof outwardly from the normal plane of the disk and pressing the disk against the side of the rim 12, and the annular surfaces of the rim may be sloped outwardly away from the opposite sides of the channel to some extent so that the disk may have a wedging action in springing the rim outwardly. In this way the disk 13 may be snapped over one edge portion of the rim and into the middle channel 12ᶜ where it will be retained in place between the flanges 12ᵇ and hold the rim 12 against contraction. The disk 13 may be provided with advertising matter 14 printed thereon so that it will serve the double function of maintaining the assembly of the tire cover while at the same time advertising the tires to which the cover is applied. When it is desired to use the tire, the cardboard locking disk 13 may be pressed laterally and destroyed, if necessary, to remove it from the rim, whereupon the rim may be contracted by moving one end thereof inwardly and causing it to overlap the other end, so that it may be moved laterally and thus permit the ready removal of the paper cover 10. It will be apparent that the metallic rim 12 may be used repeatedly for securing in place covers of paper, rubber or other flexible sheet material on a series of tires.

Although one form of the invention has been shown and described by way of illustration, it will be understood that it may be constructed in various other embodiments coming within the scope of the appended claims. In some of the claims the invention is defined as including or being associated with a tire casing but it is the intention that this term be construed to include other objects of similar shape with which the invention may be employed.

We claim:

1. A package comprising a tire casing, a flexible cover enclosing said casing, said cover extending around said casing and over the inner annular surface thereof, an annular radially expansible and contractible split rim fitting within said casing to press portions of said cover against the inner annular surface of said casing, and means mounted within said rim for holding it against contraction.

2. The combination with a tire casing, of a flexible cover extending around said casing and over the inner annular surface thereof, an annular radially expansible and contractible split rim fitting within said casing to hold said cover in position thereon, and a non-metallic deformable disk fitting within said rim to hold it against contraction.

3. The combination with a tire casing having an annular slot in its inner periphery, of a flexible cover extending around said casing and into said slot, and an annular resilient sheet metal split rim having an annular outwardly extending rib engaging said slot with a complementary groove around its inner side, said rim having parts overlapping the sides of said slot to hold said cover in place, and a disk mounted within said rim and having its edges engaging said groove to hold said rim against contraction.

CHESTER M. MacCHESNEY.
ALLEN B. WILSON.